United States Patent [19]

Goodall et al.

[11] 4,329,253
[45] May 11, 1982

[54] OLEFIN POLYMERIZATION CATALYST COMPONENT AND COMPOSITION AND METHOD OF PREPARATION

[75] Inventors: Brian L. Goodall; Adrianus A. Van der Nat; Willem Sjardijn, all of Amsterdam, Netherlands

[73] Assignee: Shell Oil Company, Houston, Tex.

[21] Appl. No.: 143,578

[22] Filed: Apr. 25, 1980

[30] Foreign Application Priority Data

Apr. 30, 1979 [GB] United Kingdom ............... 7914918

[51] Int. Cl.$^3$ ............................................. C08F 4/64
[52] U.S. Cl. ............................... 252/429 B; 526/125; 526/144; 526/139; 526/141; 526/142
[58] Field of Search ........................................ 252/429 B

[56] References Cited

U.S. PATENT DOCUMENTS

| | | | |
|---|---|---|---|
| 3,094,568 | 6/1963 | Hay et al. | 252/429 B X |
| 4,107,415 | 8/1978 | 526 | 114/ |
| 4,115,319 | 9/1978 | Scata et al. | 252/429 B |
| 4,136,243 | 1/1979 | Appleyard et al. | 526/139 |
| 4,146,502 | 3/1979 | Yokoyama et al. | 252/429 B |
| 4,151,112 | 4/1979 | Wristers | 252/429 B |
| 4,182,691 | 1/1980 | Veno et al. | 252/429 B |
| 4,210,738 | 7/1980 | Hermans et al. | 252/429 B X |
| 4,220,554 | 9/1980 | Scata et al. | 252/429 B |
| 4,224,183 | 9/1980 | Staiger | 252/429 B |
| 4,235,984 | 11/1980 | Shiga et al. | 252/429 B X |
| 4,239,650 | 12/1980 | Franke et al. | 252/429 B |
| 4,242,230 | 12/1980 | Veno et al. | 252/429 B |

FOREIGN PATENT DOCUMENTS

| | | |
|---|---|---|
| 4790 | 10/1979 | European Pat. Off. . |
| 7094 | 1/1980 | European Pat. Off. . |
| 2644440 | 4/1977 | Fed. Rep. of Germany . |
| 2912895 | 10/1979 | Fed. Rep. of Germany . |
| 1554340 | 10/1979 | United Kingdom . |

*Primary Examiner*—Patrick Garvin

[57] ABSTRACT

An olefin polymerization catalyst composition comprising:
(a) a reaction product of an organo aluminium compound and an electron donor, and
(b) a product obtained by contacting a solid component comprising a magnesium halide in which the atomic ratio of chlorine to magnesium is at least 1.2, a titanium halide and an electron donor, with a halohydrocarbon and with a tetravalent titanium compound.

22 Claims, No Drawings

OLEFIN POLYMERIZATION CATALYST COMPONENT AND COMPOSITION AND METHOD OF PREPARATION

The present invention relates to olefin polymerization catalyst compositions comprising a magnesium halide and a titanium halide and to a process for the polymerization of olefins using such catalyst compositions.

Numerous proposals are known from the prior art to provide olefin polymerization catalysts obtained by combining a constituent comprising a magnesium halide and a titanium halide with an activating organoaluminum compound. The polymerization activity and the stereospecific performance of such compositions may be improved by incorporating an electron donor (Lewis base) into the constituent comprising titanium, into the organoaluminum activating constituent or into both these constituents. The catalyst compositions of this type which have been disclosed in the prior art are able to produce olefin polymers in an attractive high yield, calculated as g polymer/g titanium, and also with the required high level of stereoregular polymeric material. However, this advantage is normally achieved at the detriment of polymer yield, calculated as g polymer/g aluminum. The attractive high polymerization activities of the relevant catalyst compositions known from the prior art are only obtained when employing very large amounts of activating organoaluminum compounds, e.g., amounts, defined in the atomic ratio of aluminum to titanium, of at least 50:1, in many cases even 100:1 or more. In addition to this, many of the proposed catalyst compositions have the disadvantage that an adequate control of the molecular weight by polymerizing in the presence of hydrogen can not be achieved without impairing the stereospecific performance of the catalyst compositions. The present invention provides improved catalyst compositions having increased polymerization activities at lower aluminum to titanium ratios, and also having an attractive stereospecific performance.

The catalyst compositions of this invention comprise (a) a reaction product of an organoaluminum compound and an electron donor and (b) a product obtained by contacting a solid component, comprising a magnesium halide in which the atomic ratio of halogen to magnesium is at least 1.2, an electron donor and a titanium halide, with a halohydrocarbon and with a tetravalent titanium compound.

In the most preferred catalyst constituents (b) the solid component which is contacted with the halohydrocarbon and with the tetravalent titanium compound comprises a magnesium dihalide.

The solid components used in this invention may be prepared by reacting the electron donor with a titanium halide and with a magnesium halide, in any order, including reactions wherein the magnesium halide is produced in situ, e.g. by converting another magnesium compound with a halogenating agent such as hydrogen chloride or an excess of titanium tetrahalide, into a magnesium dihalide. The component preferably comprises a halide of tetravalent titanium but may also comprise varying amounts of a titanium trihalide. The latter situation may arise when the magnesium halide is prepared by converting a dialkyl magnesium compound, an alkyl magnesium halide or an alkyl magnesium alkoxide into a magnesium dihalide by reacting with a titanium tetrahalide. The formation of the magnesium dihalide then proceeds under simultaneous reduction of titanium tetrahalide to titanium trihalide, and dependent upon the molar amount of tetrahalide employed this reduction may be complete or only partial. Subsequent to such conversion, the electron donor may then be incorporated into the reaction product to produce the desired solid component which is contacted with the halohydrocarbon and with the tetravalent titanium compound. Alternatively, the conversion of the magnesium compound may be effected in the presence of an electron donor.

Suitable methods for preparing the magnesium halide include for example:

halogenation of a magnesium dialkoxide or diaryloxide, such as magnesium diethoxide or diphenoxide, by reacting with titanium tetrahalide or another relatively strong halogenating agent, such as silicon tetrachloride or a di- or tri-chloroalkyl silane;

chlorination of magnesium powder with gaseous chlorine, or hydrogen chloride;

halogenation of a dialkyl magnesium compound, such as diethyl magnesium, with hydrogen chloride;

comminuting a commercial magnesium dihalide, e.g. by milling or grinding, optionally in the presence of an electron donor and/or titanium tetrahalide, to reduce the particle size of the commercial product;

halogenation of a dialkyl or diaryl magnesium compound or an alkyl or aryl magnesium halide or an aryl or alkyl magnesium alkoxide with a halogenating agent such as a titanium tetrahalide, silicon tetrahalide, di- or tri-chloro(alkyl) silane, alkylaluminum halide or carbon tetrachloride;

halogenation of magnesium acetyl acetonate, magnesium oxide, magnesium carbonate, or a magnesium carboxylate with titanium tetrahalide or another convenient halogenating agent such as chloro silanes or silicon tetrachloride.

In the case of halogenation of magnesium dialkoxides and diaryloxides, halogenation with halohydrocarbons, e.g. carbon tetrachloride, cannot be employed to produce magnesium dihalides since such agents are not strong enough to effect any noticeable halogenating action. Instead, these agents should be considered substantially chemically inert towards magnesium dialkoxides and diaryloxides.

Any and all of the halogenation reactions to convert magnesium compounds may be effected in the presence of an electron donor or the electron donor may be added after the halogenation has been carried out. When halogenation of the magnesium compound is effected with a titanium tetrahalide, the solid component so formed will normally contain the desired amount of titanium halide and there is no need to introduce further amounts of titanium halide into the solid component before the latter is subjected to the following treatments with halohydrocarbon and the tetravalent titanium compound. The preferred halogen atom in both the magnesium halide and the titanium halide is chlorine.

Preferred solid components are those obtained by reacting a magnesium dihalide with a titanium tetrahalide and with an electron donor, or by reacting a magnesium dialkoxide or diaryloxide with a titanium tetrahalide and with an electron donor, or by reacting a dialkyl magnesium compound with a titanium tetrahalide and with an electron donor.

The molar ratio of electron donor to magnesium in the solid component is preferably from 0.05 to 10, particularly from 0.1 to 5.0. The atomic ratio of titanium to magnesium in the solid component is preferably from 0.005 to 4.0, particularly from 0.02 to 1.5, and the atomic ratio of halogen to magnesium in the magnesium halide is preferably at least 1.5.

Preferred solid components can therefore be represented by the general formulae (which are considered equivalent in the context of this invention):

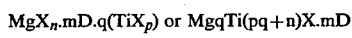

in which X is halogen, preferably chlorine, D is an electron donor;

n is at least 1.2, preferably at least 1.5;
m is a number of 0.05 to 10, preferably from 0.1 to 5.0;
p is a number of from 3 to 4, preferably 4 and
q is a number of from 0.005 to 4.0, preferably from 0.02 to 1.5.

Another group of preferred solid components can be represented by the same general formulae, but wherein at least 70% of groups X represent halogen and the remaining groups X represent organic groups, e.g. aryl oxide or alkoxide groups.

Suitable electron donors are ethers, esters, ketones, phenols, amines, amides, imines, nitriles, phosphines, phosphites, stibines, arsines, phosphoramides and alcoholates.

Examples of suitable donors are those referred to in British Patent Specification No. 1,486,194 and its equivalent U.S. Pat. No. 4,136,243 to Appleyard et al. and German Offenlegungsschrift No. 2,729,196. Preferred donors are esters and diamines, particularly esters of aromatic carboxylic acids, such as ethyl and methyl benzoate, p-methoxy ethylbenzoate, p-ethoxy methyl benzoate, ethyl acrylate, methyl methacrylate, ethyl acetate, dimethyl carbonate, dimethyl adipate, dihexyl fumarate, dibutyl maleate, ethyl-isopropyl oxalate, ethyl p-chlorobenzoate, hexyl p-amino benzoate, isopropyl naphthenate, n-amyl toluate, ethyl cyclohexanoate, propyl pivalate, N,N,N',N'-tetramethyl ethylene diamine, 1,2,4-trimethyl piperazine 2,3,4,5-tetraethyl piperidine and similar compounds.

Any of these electron donors may be used in the preparation of catalyst constituents (a) or (b). The donor used in one of the constituents may be the same as or different from the donor used for preparing the other one.

The organoaluminum compound to be employed in component (a) may be chosen from any of the known activators in catalyst systems comprising titanium halides. Thus, aluminum trialkyl compounds, dialkyl aluminum halides and dialkyl aluminium alkoxides may be successfully used. Aluminum trialkyl compounds are preferred, particularly those wherein each of the alkyl groups has 2 to 6 carbon atoms, e.g. aluminum triethyl, aluminum tri-n-propyl, aluminum tri-isobutyl and aluminum tri-isopropyl and aluminum dibutyl-n-amyl.

Preferred amounts of electron donor in constituent (a), calculated as mol. per mol. aluminum compound, are chosen within the range of from 0.1 to 1.5, particularly from 0.2 to 0.8.

The contacting of the solid component comprising a magnesium halide, a titanium halide and an electron donor, with halohydrocarbon and with the tetravalent titanium compound may be effected simultaneously or, preferably, by first contacting with halohydrocarbon and then with the tetravalent titanium compound. Inert hydrocarbon diluents may be present during each of these contacting stages but it is preferred to carry out these stages with undiluted reactants. Temperatures employed during contacting may range from room temperature to the boiling point of the contacting agents. The time period of the contacting is not very critical, one may employ relatively short periods of, say, twenty minutes but also periods of several hours, preferably not more than 4 hours. The amount of halohydrocarbon to be employed will usually be chosen to produce slurry concentrations of from 5 to 150 g solid per l, preferably from 10–100 g/l.

Preferred halohydrocarbons are aliphatic hydrocarbons with 1 to 12 carbon atoms, comprising at least two halogen atoms, such as trichloro methane, dichloro ethane, dichloro butane, trichloro cyclohexane, trichlorofluoro octane and dibromofluoro decane. Carbon tetrachloride is particularly preferred. Aromatic hydrocarbons may also be employed, e.g., chloro benzenes or chloro toluenes. The contacting may effect an increase of the halogen content of the magnesium halide contained in the solid component, but this is by no means essential. Neither is it essential that the contacting with halohydrocarbon results in an incorporation of this halohydrocarbon into the catalyst constituent. To the contrary, it is preferred to remove any halohydrocarbon that remains in the catalyst constituent in any form, e.g., as physically absorbed material, by washing with an inert aliphatic or aromatic hydrocarbon diluent. In this respect the contacting with halohydrocarbon should be considered an extraction treatment rather than a chemical reaction.

The treatment of the solid component with the tetravalent titanium compound, preferably a halide of tetravalent titanium, serves to increase the tetravalent titanium content of catalyst constituent (b). This increase should preferably be sufficient to achieve a final atomic ratio of tetravalent titanium to magnesium in this catalyst constituent of from 0.005 to 3.0, particularly of from 0.02 to 1.0. To this purpose the contacting with the halide of tetravalent titanium is most suitably carried out at a temperature of from 40° to 136° C. during 0.1–6 hours. Particularly preferred contacting tempertures are those from 60° to 130° C. and the most preferred contacting periods are in between 0.5 to 2.5 hours. Suitable halides of tetravalent titanium are for example dialkoxy titanium dihalides, diaryloxy titanium dihalides, alkoxy titanium trihalides, aryloxy titanium trihalides, titanium tetraalkoxides and preferably titanium tetrahalides. The preferred halogen atom in such compounds is chlorine.

After the treatment with the tetravalent titanium compound the catalyst constituent may be washed to remove absorbed, unreacted titanium compound. Catalyst constituents (b), produced as described hereinbefore are also included within this invention.

To prepare the final polymerization catalyst composition constituents (a) and (b) are simply combined, preferably employing such amounts as to produce in the final catalyst composition an atomic ratio of aluminum to titanium of 1 to 50.

The present invention is also concerned with a process for polymerizing an olefin such as ethylene or butylene, preferably propylene, employing the novel catalyst compositions. These polymerizations may be carried out by any one of the conventional techniques, such as gas phase polymerization or slurry polymerization using liquid monomer or an inert hydrocarbon diluent as liquid medium. Hydrogen may be used to control the molecular weight of the polymer without detriment to the stereospecific performance of the catalyst composition. Polymerization may be effected batchwise or continuously, with constant or intermittent supply of the novel catalyst composition or one of the catalyst constituents (a) or (b) to the polymerization reactor. The activity of the novel catalyst compositions is so pronounced that there is no need for any catalyst removal or polymer extraction techniques. Total inorganic residues in the polymer, i.e. the combined aluminum, chlorine, and titanium content, can be as low as 200 ppm, even less than 100 ppm, as will be shown in the Examples.

In the following Examples the polymerization activity of the various catalyst systems is determined by the following standard polymerization test:

Triethyl aluminum (Act) and p-methoxy ethylbenzoate (ED) were mixed in varying amounts during 5 minutes at room temperature in 40 ml iso-octane and introduced into a 1 l autoclave containing 364 g liquid propylene and hydrogen (partial hydrogen pressure 98 kPa). Immediately thereafter the solid catalyst constituent was introduced into the reactor, in the form of a suspension in 20 ml iso-octane. The autoclave was then heated to 60° C. in 5 minutes and the polymerization was continued at that temperature and a total pressure of 2650 kPa, whilst stirring the contents of the reactor.

After polymerization, remaining unconverted liquid polypropylene was removed by depressurizing and the polymer was analyzed to determine the contents of amorphous material (XS)—i.e. the percentage of material remaining soluble when cooling a solution of polymer in xylene from its boiling point to room temperature—and the contents of Ti, Al and Cl in the polymer. No intermediate treatments to deactivate the catalyst or to purify the polymer by extraction were employed.

In the Tables given below the Al/Ti molar ratio in the catalyst systems is expressed as a ratio of x:1, x having the values shown.

EXAMPLE 1

22.1 g anhydrous $MgCl_2$ (232 mmol.) and 11.7 g ethyl benzoate (78 mmol.) were milled together in a ball mill, at ambient temperature, under a $N_2$ atmosphere, during three days. 25 g of the resulting product were suspended in 218 ml liquid $TiCl_4$ (2000 mmol.) at 80° C. and stirred during 2 hours. The solid formed was isolated by filtration at 80° C. and washed 5 times with iso-octane at 70° C. 26.1 g of a solid (constituent A) were formed which comprised 0.9%w of Ti, calculated on metal on the total weight of the solid. Chemical analysis of this solid showed that its composition corresponds with the formula $MgCl_2.0.026\ TiCl_4.0.157\ EB$, wherein EB stands for ethyl benzoate.

0.5 g of constituent (A) was suspended in 25 ml carbon tetrachloride (260 mmol.) at 70° C. for 1.5 hours under stirring. The liquid phase was removed by decantation and the white powderous solid formed (constituent B) was washed five times with iso-octane at 70° C.

This constituent B was suspended in 25 ml liquid $TiCl_4$ (227 mmol.) at 80° C. and stirred during 1 hour at that temperature. After isolating the solid by decantation a pale yellow powderous product was obtained which was washed five times with iso-octane at 70° C. The yellow product (constituent C) has a Ti content of 1.8%w.

EXAMPLE 2

10 g magnesium turnings (412 mat) were reacted at room temperature with ethanol employing a mixture comprising 100 ml ethanol, 20 ml xylene, 5 mg of mercuri chloride (0.02 mmol.) and 3 mg iodine (0.02 mmol.). The reaction took 5 hours for completion. Subsequently, the liquid phase was removed by distillation and the resulting solid was dried under a nitrogen vacuum in the complete absence of moisture.

50 mmol. of the magnesium diethoxide so obtained were suspended in a mixture of 75 ml toluene and 16.7 mmol. ethyl benzoate. Then, 75 ml liquid $TiCl_4$ (681 mmol.) were added and the mixture was stirred at 80° C. during 2 hours. After filtration and washing five times with iso-octane at 70° C., there resulted a pale yellow solid comprising 3.4%w of Ti (constituent D).

0.5 g of constituent D was suspended in 25 ml carbon tetrachloride (260 mmol.) at 70° C. and the suspension was stirred during 1.5 hours. The liquid phase was removed by decantation and the remaining white powderous solid was washed five times with iso-octane at 70° C. and then stirred in 25 ml liquid $TiCl_4$ (227 mmol.) at 80° C. during 2 hours. The product that had been treated with $TiCl_4$ was also washed in an identical manner after removal of the liquid phase by decantation. There resulted a pale yellow solid (constituent E) comprising 4.4%w Ti.

EXAMPLE 3

Example 2 was repeated, now employing 50 mmol. of a commercial grade magnesium diethoxide, which is available in a pelletized form, instead of the magnesium diethoxide prepared from magnesium turnings. All other conditions for the preparation of the final product (constituent F) were identical to those described in Example 2. The amount of titanium in this product was 3.9%w.

EXAMPLE 4

In order to see whether magnesium diethoxide can be halogenated by reaction with carbon tetrachloride, 10 mmol. magnesium diethoxide were suspended in a mixture of 15 ml tetrachloride (155 mmol.) and 3.3 mmol. ethyl benzoate and the suspension was stirred at 75° C. for 2 hours. After washing five times with iso-octane, there resulted a white solid comprising only 0.23%w of Cl, thus showing that only a negligible halogenation had taken place. Hence, this example serves for comparison only.

Table I shows the results obtained by testing the solid constituents A to F in the standard polymerization test.

TABLE I

| Solid constituent | | A* | B* | C | C | D* | E | E | F | F |
|---|---|---|---|---|---|---|---|---|---|---|
| Solid constituent | mg | 42 | 17 | 12 | 24 | 9 | 14 | 7 | 14 | 5 |
| Act. | mmol. | 0.3 | 0.6 | 0.6 | 0.3 | 0.3 | 0.3 | 0.3 | 0.3 | 0.3 |
| ED | mmol. | 0.09 | 0.17 | 0.17 | 0.09 | 0.09 | 0.09 | 0.09 | 0.09 | 0.09 |
| Al/Ti | x | 38 | — | 125 | 30 | 47 | 24 | 48 | 25 | 79 |
| Time | hrs | 0.7 | 3 | 3.0 | 0.25 | 0.7 | 1.3 | 2.1 | 0.2 | 1.5 |
| Yield | kg/g cat. | 1.2 | 0.3 | 15.0 | 9.0 | 0.7 | 12.0 | 18.0 | 7.1 | 20.7 |

TABLE I-continued

| Solid constituent | | A* | B* | C | C | D* | E | E | F | F |
|---|---|---|---|---|---|---|---|---|---|---|
| Yield | kg/g cat./h | 1.7 | — | 5.0 | 36.0 | 1.0 | 9.2 | 8.6 | 35.5 | 13.8 |
| Yield | kg/g Ti | 135 | — | 815 | 500 | 19.5 | 270 | 407 | 183 | 530 |
| Yield | kg/g Ti/h | 193 | — | 272 | 2000 | 28 | 208 | 194 | 915 | 353 |
| XS | % w | 4.9 | — | 8.1 | 5.4 | — | 7.5 | 6.4 | 5.4 | 6.5 |
| Ti | ppm | 6 | — | 2 | 2 | — | 3 | 3 | 5 | 2 |
| Al | ppm | 190 | — | 141 | 33 | — | 38 | 60 | 75 | 77 |
| Cl | ppm | 250 | — | 47 | 56 | — | 45 | 30 | 83 | 38 |

*for comparison

EXAMPLE 5

0.8 g n-butyl-ethyl magnesium (7.4 mmol.) dissolved in 12.3 ml n-heptane was mixed with 25 ml iso-octane. The mixture was cooled to −40° C. and at that temperature a solution of 105 mg ethylbenzoate (0.7 mmol.) in 12 ml iso-octane was added, followed by addition of 8 ml liquid $TiCl_4$ (72.8 mmol.). The mixture was slowly heated to 70° C. during a period of 30 minutes and kept at that temperature for 10 minutes. The solid formed was isolated from the liquid phase by decantation and washed three times with iso-octane at 25° C.

Thereafter, 0.9 g of the solid was suspended in 30 ml carbon tetrachloride and stirred for 1.5 hours at 70° C. After decantation the solid was washed 2 times with iso-octane.

Subsequently, the washed solid was suspended in 25 ml liquid $TiCl_4$ (227 mmol.) and the suspension was stirred at 110° C. for 2 hours. The solid was isolated by decantation and washed 6 times with iso-octane at 70° C. (constituent G). This component contains 3.1% w of Ti.

EXAMPLE 6

10.9 g n-butyl-ethyl magnesium (100 mmol.), dissolved in a mixture of 50 ml dibutyl ether (300 mmol.) and 100 ml toluene and 150 ml n-heptane, were combined at 60° C. with a mixture of 100 mmol. ethyl alcohol, 150 ml toluene and 150 ml liquid $TiCl_4$ (1360 mmol.) and the reaction mixture was kept at 90° C. for 1 hour. The solid precipitate formed was isolated by the decantation and washed six times with iso-octane at 25° C. (constituent H).

The Ti-content in this solid is 15.3% w. Chemical analysis of the solid showed that its composition corresponds with the formula $MgCl_2.0.919\ TiCl_{3.22}.0.215$ DBE, wherein DBE represents dibutyl ether.

2.5 g of this component were reacted with 105 mg ethyl benzoate (0.7 mmol.) and with 25 ml carbon tetrachloride (260 mmol.) at 70° C. during 1 hour. After decanting the liquid phase the solid was washed two times with iso-octane at 25° C. Thereafter the solid was suspended in 25 ml liquid $TiCl_4$ (227 mmol.) at 125° C. during 2 hours. Then the final product was isolated by decantation and washed six times with iso-octane at 70° C. This product (constituent I) contained 3.1% w of Ti.

EXAMPLE 7

4 g of constituent H, prepared as indicated in Example 6, were milled together with 280 mg auminum trichloride (2 mmol.) and with 300 mg ethyl benzoate (2 mmol.) at ambient temperature, under a $N_2$ atmosphere, during 16 hours. Upon analysis the resulting product appeared to correspond with the formula $MgCl_2.0.9\ TiCl_{3.19}.0.13\ AlCl_3.0.174\ DBE.0.324\ EB$, wherein DBE stands for dibutyl ether and EB for ethyl benzoate.

3 g of the ground reaction product were then treated with 25 ml carbon tetrachloride and then with 25 ml $TiCl_4$ repeating all conditions of Example 6. The final product (constituent J) has a Ti content of 4.6% w.

TABLE II

| Solid constituent | | G | G | I | J | J | J |
|---|---|---|---|---|---|---|---|
| Solid constituent | mg | 20 | 10 | 22 | 20 | 20 | 15 |
| Act | mmol. | 0.6 | 0.3 | 0.6 | 0.6 | 0.3 | 0.45 |
| ED | mmol. | 0.17 | 0.085 | 0.17 | 0.17 | 0.085 | 0.13 |
| Al/Ti | x | 45 | 45 | 40 | 31 | 15 | 31 |
| Time | hrs | 0.2 | 2.8 | 1 | 0.66 | 3 | 2 |
| Yield | kg/g cat. | 5.1 | 8.1 | 6.4 | 11.3 | 6.1 | 15.4 |
| Yield | kg/g cat./h | 25.5 | 2.9 | 6.4 | 17.0 | 2.0 | 7.7 |
| Yield | kg/g Ti | 162 | 270 | 205 | 245 | 133 | 251 |
| Yield | kg/g Ti/h | 810 | 96 | 205 | 371 | 44 | 126 |
| XS | % w | 12.6 | 11.5 | 9.5 | 11.8 | 13.4 | 13.1 |
| Ti | ppm | 6 | 4 | 6 | 4 | 7 | 3 |
| Al | ppm | 160 | 100 | 115 | 77 | 82 | 53 |
| Cl | ppm | 117 | 74 | 100 | 48 | 86 | 39 |

EXAMPLE 8

40 mmol. of commercial magnesium diethoxide were suspended in a mixture of 40 ml toluene and 13.2 mmol. ethyl benzoate. Then, 40 ml liquid $TiCl_4$ (363 mmol.) were added to the mixture at ambient temperature before heating to 80° C. for 2 hours. After filtration and washing once with toluene and five times with iso-octane at 70° C. there resulted a light brown solid comprising 4.4% w of Ti (constituent K).

1 g of constituent K was suspended in 40 ml 1,2-dichloroethane at 70° C. and stirred during 2 hours. The liquid phase was removed by decantation. The remaining white solid was washed once with 1,2-dichloroethane and 4 times with iso-octane at 70° C. and then stirred in 40 ml liquid $TiCl_4$ (363 mmol.) at 80° C. during 2 hours. The liquid phase was removed by filtration and the resulting light brown solid was washed five times with iso-octane at 70° C. The solid product so obtained (constituent L) comprised 3.1% w Ti.

For comparison 1 g of constituent K was suspended in 40 ml liquid $TiCl_4$ at 80° C. and the mixture was stirred during 2 hours at that temperature. After decanting and washing in the way indicated for constituent L there resulted a light brown solid (constituent M) comprising 3.6% w Ti.

EXAMPLE 9

30 mmol. of commercial magnesium diethoxide were suspended in a mixture of 30 ml toluene and 10 mmol. ethyl benzoate. Then, 45 ml liquid $TiCl_4$ (408 mmol.) were added to the mixture at ambient temperature before heating to 80° C. for 2 hours. After filtration and washing five times with iso-octane at 70° C. the resulting solid was suspended in a solution of 8.5 g hexachloroethane (36 mmol.) in 75 ml iso-octane at 70° C. and stirred for 2 hours. The liquid phase was removed by filtration and the solid was washed five times with iso-octane at 70° C. Then, the solid was suspended in 50 ml liquid TiCl4 (454 mmol.) and the mixture was stirred at 80° C. for 2 hours. The solid was filtered off, washed five times with iso-octane at 70° C. The resulting light brown product (constituent N) comprised 3.3% w Ti.

EXAMPLE 10

80 mmol. of 2,6-di-tert.butyl-4-methyl phenol in 80 ml toluene were added to a stirred solution of 40 mmol. ethyl butyl magnesium in heptane (67 ml of a 0.6 mol./l solution). To this solution were added 13.4 mmol. ethyl benzoate. The resulting homogeneous solution was cooled to 0° C. and a solution of 30 ml TiCl4 (272 mmol.) in 100 ml toluene was added while stirring. 100 ml carbon tetrachloride (1040 mmol.) were added to the resulting deep-red suspension which was subsequently heated to 70° C. for one hour whilst stirring. The liquid phase was removed by filtration and the resulting brown solid was washed 4 times with iso-octane at 70° C. yielding a solid (constituent O) comprising 1.2% w Ti.

75% of the total amount of constituent O were suspended in 100 ml liquid TiCl4 (908 mmol.) and stirred for 1 hour at 80° C. The resulting solid was isolated by decanting the liquid phase and washing 5 times with iso-octane at 70° C. The brown solid (constituent P) comprised 1.5% w Ti.

The polymerization activity of constituents K to P were determined under the standard polymerization test conditions except that for constituents K, L and M the polymerization runs were effected at a temperature of 70° C. and a pressure of 3100 kPa.

Table III lists the reslts of the polymerization tests.

TABLE III

| Solid constituent | | K* | L | M* | N | O* | P |
|---|---|---|---|---|---|---|---|
| Solid constituent | mg | 10 | 10 | 10 | 15 | 24 | 18 |
| Act | mmol. | 0.3 | 0.3 | 0.3 | 0.27 | 0.15 | 0.3 |
| ED | mmol. | 0.09 | 0.09 | 0.09 | 0.09 | — | 0.09 |
| Al/Ti | x | 33 | 46 | 40 | 26 | 25 | 28 |
| Time | hrs | 1 | 1 | 1 | 1 | 1 | 1 |
| Yield | kg/g cat. | 2.1 | 5.6 | 2.2 | 7.5 | <0.1 | 5.8 |
| Yield | kg/g Ti | 47 | 181 | 61 | 226 | — | 385 |
| XS | % w | 8.8 | 7.9 | 8.7 | 8.0 | — | 5.2 |
| Ti | ppm | 20 | 5 | 17 | 4 | — | 3 |
| Al | ppm | 370 | 120 | 380 | 59 | — | 71 |
| Cl | ppm | 200 | 75 | 250 | 60 | — | 58 |

*for comparison

We claim:

1. A solid constituent for olefin polymerization catalysts obtained by
   i contacting a solid reaction product comprising a magnesium halide in which the atomic ratio of halogen to magnesium is at least 1.2:1, a titanium halide and an electron donor with a halohydrocarbon in liquid phase;
   ii optionally washing the resulting solid with an inert diluent to remove liquid remaining from the contacting step;
   iii contacting the resulting solid with a halide of tetravalent titanium in liquid phase; and
   iv washing the resulting solid with an inert diluent to remove residual unreacted titanium compound.

2. A solid constituent for olefin polymerization catalyst compositions, containing titanium and magnesium in an atomic ratio of Ti:Mg in the range from 0.005:1 to 3:1, obtained by contacting a solid reaction product comprising a magnesium chloride, a titanium chloride and an electron donor, wherein the atomic ratio of chlorine to magnesium in the magnesium chloride is at least 1.5:1, and the electron donor is an ether, ester, amine, phenol or phosphine, present in a ratio of 0.01 to 5 mole of electron donor per atom of magnesium, with a chlorohydrocarbon having 1 to 12 carbon atoms in liquid phase;
   ii optionally washing the resulting solid with an inert diluent to remove liquid remaining from the contacting step;
   iii contacting the resulting solid with a chloride of tetravalent titanium in liquid phase; and
   iv washing the resulting solid with an inert diluent to remove residual unreacted titanium compound.

3. A composition according to claim 2 wherein said chlorohydrocarbon is carbon tetrachloride, said electron donor is an aromatic ester and said titanium chloride and said halide of tetravalent titanium are titanium tetrachloride.

4. A solid constituent for olefin polymerization catalyst compositions, containing titanium and magnesium in an atomic ratio of Ti:Mg in the range from 0.02:1 to 1:1, obtained by contacting a solid reaction product comprising magnesium dichloride, titanium tetrachloride and an aromatic ester electron donor, present in a ratio of 0.01 to 5 moles of electron donor per atom of magnesium, in a first contacting step with a chlorohydrocarbon having 1 to 12 carbon atoms and contacting the resulting solid with titanium tetrachloride in a second contacting step.

5. A composition according to claim 4 wherein said chlorohydrocarbon is carbon tetrachloride.

6. A composition according to claims 2 or 4 in which said chlorohydrocarbon has at least two chlorine atoms per molecule.

7. A composition according to claims 4 or 5 wherein said electron donor is ethyl benzoate.

8. A composition according to claims 2, 3, 4 or 5 wherein said solid reaction product has been obtained by reacting magnesium dichloride with titanium tetrachloride and with an electron donor.

9. A composition according to claims 2, 3, 4 or 5 wherein said solid reaction product has been obtained by reacting a magnesium dialkoxide or diaryloxide with titanium tetrachloride and with an electron donor.

10. A composition according to claims 2, 3, 4 or 5 wherein said solid reaction product has been obtained by reacting a dialkyl magnesium compound with titanium tetrachloride and with an electron donor.

11. An olefin polymerization catalyst composition comprising:
   (a) a reaction product of an organoaluminum compound and an electron donor, and
   (b) a product obtained by
      i contacting a solid reaction product comprising a magnesium halide, in which the atomic ratio of halogen to magnesium is at least 1.2:1, a titanium halide and an electron donor, with a halohydrocarbon in liquid phase;
      ii optionally washing the resulting solid with an inert diluent to remove liquid remaining from the contacting step;
      iii contacting the resulting solid with a halide of tetravalent titanium in liquid phase; and
      iv washing the resulting solid with an inert diluent to remove residual unreacted titanium compound.

12. An olefin polymerization catalyst composition comprising (a) a reaction product of an organalumium compound and an electron donor and (b) a solid constituent according to claims 2, 3, 4 or 5.

13. An olefin polymerization catalyst composition according to claim 12 wherein the organoaluminum compound is an aluminum trialkyl and the electron donor is an aromatic ester.

14. An olefin polymerization catalyst composition according to claim 12 wherein the organoaluminum compound is aluminum triethyl and the electron donor of component (a) is ethyl anisate.

15. A composition according to claim 12 in which the atomic ratio of aluminum in component (a) to titanium in component (b) is from 1:1 to 50:1.

16. A composition according to claim 13 in which the atomic ratio of aluminum in component (a) to titanium in component (b) is from 1:1 to 50:1.

17. A composition according to claim 14 in which the atomic ratio of aluminum in component (a) to titanium in component (b) is from 1:1 to 50:1.

18. A method for the preparation of a solid component for olefin catalyst compositions, comprising contacting a solid reaction product comprising a magnesium halide in which the atomic ratio of halogen to magnesium is at least 1.2, a titanium halide and an electron donor with a halohydrocarbon in liquid phase;
   ii optionally washing the resulting solid with an inert diluent to remove liquid remaining from the contacting step;
   iii contacting the resulting solid with a halide of tetravalent titanium in liquid phase; and
   iv washing the resulting solid with an inert diluent to remove residual unreacted titanium compound.

19. A method for the preparation of a solid component for olefin catalyst compositions, comprising contacting a solid reaction product comprising a magnesium chloride, a titanium chloride and an electron donor, wherein the atomic ratio of chlorine to magnesium in the magnesium chloride is at least 1.5:1, and the electron donor is an ether, ester, amine, phenol or phosphine, present in a ratio of 0.01:1 to 5:1 mole of electron donor per atom of magnesium, with a chlorohydrocarbon having 1 to 12 carbon atoms in liquid phase;
   ii optionally washing the resulting solid with an inert diluent to remove liquid remaining from the contacting step;
   iii contacting the resulting solid with a chloride of tetravalent titanium in liquid phase; and
   iv washing the resulting solid with an inert diluent to remove residual unreacted titanium compound.

20. A method for the preparation of a solid component for olefin catalyst compositions, comprising contacting a solid reaction product comprising magnesium dichloride, titanium tetrachloride and an aromatic ester electron donor in a ratio of 0.01 to 5 moles of electron donor per atom of magnesium with a chlorohydrocarbon having 1 to 12 carbon atoms, separating the solid reaction product from the reaction mixture, optionally washing it with an inert diluent to remove any unreacted material, thereafter contacting the resulting solid with titanium tetrachloride, separating the resulting solid from the liquid medium, and washing it with an inert diluent to remove all unreacted titanium compound.

21. A method according to claims 19 or 20 in which said chlorohydrocarbon has at least two chlorine atoms per molecule.

22. The method according to claim 20 wherein said chlorohydrocarbon is carbon tetrachloride and said electron donor is ethyl benzoate.

* * * * *